(12) United States Patent
Tsukada

(10) Patent No.: US 7,656,761 B2
(45) Date of Patent: Feb. 2, 2010

(54) OPTICAL DISC DEVICE

(75) Inventor: Seiji Tsukada, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 693 days.

(21) Appl. No.: 11/344,210

(22) Filed: Feb. 1, 2006

(65) Prior Publication Data
US 2006/0171270 A1    Aug. 3, 2006

(30) Foreign Application Priority Data
Feb. 2, 2005    (JP)    ............... P2005-026136

(51) Int. Cl.
*G11B 7/00*    (2006.01)
(52) U.S. Cl. .................... 369/47.53; 369/119
(58) Field of Classification Search ............... 369/47.5, 369/47.51, 47.52, 47.53, 47.54, 116
See application file for complete search history.

(56) References Cited
U.S. PATENT DOCUMENTS
2006/0153035 A1 * 7/2006 Eguchi et al. ............ 369/47.53

FOREIGN PATENT DOCUMENTS
| JP | 2000-195053 | 7/2000 |
| JP | A-2003-099933 | 4/2003 |
| JP | 2004-86951 | 3/2004 |

* cited by examiner

*Primary Examiner*—Nabil Z Hindi
(74) *Attorney, Agent, or Firm*—Morgan, Lewis & Bockius LLP

(57) ABSTRACT

An optical disc device includes a recording power acquiring unit that finds an optimum recording power when data is written in a data area by writing data for calibration in a power calibration area, and a data writing unit that writes data in a data area to be written by using an optimum recording power found by the recording power acquiring unit. A method for acquiring an optimum recording power used by the recording power acquiring unit when an area to be written is a not-yet-recorded area is different from a method for an already recorded area. When an area to be written is a not-yet-recorded area, the recording power acquiring unit finds an optimum recording power. When an area to be written is an already recorded area, the recording power acquiring unit writes preliminary data in a power calibration area and finds an optimum recording power.

4 Claims, 4 Drawing Sheets

FIG. 4A

| STARTING ADDRESS | ENDING ADDRESS | RECORDING LASER POWER |
|---|---|---|
| A1 | A2 | Lpa1 |
| A2 | A3 | Lpa2 |
| A3 | A4 | Lpa3 |

FIG. 4B

| STARTING ADDRESS | ENDING ADDRESS | RECORDING LASER POWER |
|---|---|---|
| A1 | A5 | Lpa1 |
| A5 | A2 | Lpb1 |
| A2 | A3 | Lpb2 |
| A3 | A4 | Lpb3 |
| A4 | A6 | Lpb4 |

FIG. 4C

| STARTING ADDRESS | ENDING ADDRESS | RECORDING LASER POWER |
|---|---|---|
| A1 | A5 | Lpa1 |
| A5 | A6 | Lpb1 |

OPTICAL DISC DEVICE

BACKGROUND OF THE INVENTION

1. Field of the Invention

The present invention relates to an optical disc device that finds an optimum recording power when data is written in a data area by writing data for calibration to the power calibration area of an optical disc, and in more detail, to an optical disc device in which a method for acquiring an optimum recording power when an area to be written is a not-yet-recorded area is different from a method for acquiring an optimum recording power when an area to be written is an already recorded area.

2. Description of the Related Art

When data is written to a rewritable optical disc such as a DVD-RW, an optimum recording power at the time of recording data is found before writing data. That is, data is written for calibration to a power calibration area (PCA) while changing laser power and an optimum recording power used for recording data is found from the reproducing signal of data written for calibration. However, an optimum recording power is different between a case where an area in which data is to be written is an area in which data has not yet recorded and a case where an area in which data is to be written is an area in which data has been already written. Then, in a case where an area in which data is to be written is an area in which data has been already written, an optimum recording power is also different depending on the intensity of laser power used for writing data. For this reason, there has been proposed the technology to be described below.

That is, in this technology, it is checked whether an area in which data is to be recorded is a not-yet-recorded area or an already recorded area in which data has been already recorded. Then, when an area in which data is to be recorded is a not-yet-recorded area, data is written for calibration to a power calibration area while changing the intensity of a recording laser power stepwise and finds an optimum recording power from the waveform of the reproducing signal of data written for calibration and then records data by using the found optimum recording power, whereas when an area in which data is to be recorded is an already recorded area, just as with the case of the not-yet-recorded area, an optimum recording power is found by using a power calibration area and the already recorded area is reproduced and the demodulation degree Mopt of the already recorded area is found from a reproducing signal at that time and then the found modulation degree Mopt is compared with a modulation degree Mtarget that has been previously set for each device.

As a result of comparison, when it is determined that the modulation degree Mopt of the already recorded area is larger than the modulation degree Mtarget that has been previously set for the device, data is written by using a laser power a little smaller than an optimum recording power found by using a power calibration area. Meanwhile, when it is determined that the modulation degree Mopt of the already recorded area is equal to the modulation degree Mtarget that has been previously set for the device, data is written by using the optimum recording power found by using a power calibration area. Then, when it is determined that the modulation degree Mopt of the already recorded area is smaller than the modulation degree Mtarget that has been previously set for the device, data is written by using a laser power a little larger than the optimum recording power found by using a power calibration area.

In other words, when date is overwritten in an already recorded area, a laser power when data has been written in the already recorded area is detected as a modulation degree. Then, the optimum recording power found by using a power calibration area is corrected on the basis of a detected laser power and data is overwritten in the already recorded area by using the corrected optimum recording power. That is, the laser power when data has been overwritten in the already recorded area is corrected according to the state of the already recorded area. For this reason, it is possible to prevent a laser power from being insufficient at the time of writing data or from being unnecessarily intensive. Hence, there is provided an advantage that the reliability of writing data can be improved without damaging the durability of an optical disc (refer to, for example, JP-A-2003-99933 (paragraph No. 0015)).

However, there have been raised problems shown below at the time of using the above-mentioned conventional technology. That is, even if laser power for writing is finely adjusted according to a comparison result between the modulation degree of an already recorded area and a modulation degree previously set for each device, the finely adjusted laser power becomes only a value considered to be optimum from previously obtained experimental data. That is, the finely adjusted laser power does not become a laser power corresponding to the state at that time of the already recorded area of an optical disc to which data is to be written or the state at that time of an optical pickup (ambient temperature and the like). For this reason, there is a case where laser power used for writing data to an already recorded area and having its intensity finely adjusted is deviated from an optimum value and hence there are sometimes presented the problem of reducing the reliability of written data and the problem of causing the life of the optical disc to be unnecessarily short.

The present invention has been made to solve the above problems. An object of the present invention is to provide an optical disc device that can record data by using a recording laser power to make an actually reproduced signal an optimum signal in both cases of a case where an area to be written is a not-yet-recorded area and a case where an area to be written is an already recorded area, and can make a recording laser power an optimum value for each data area even when an area to be written includes areas in which data has been written by recording laser powers that are different from each other, and can eliminate the need for additionally providing the function of causing the device to be more complex such as storing means for storing much laser power information and managing means for managing laser power information, and can write data continuously without interruption even when an area to be written includes areas in which data has been written by using recording laser powers that are different from each other and recording laser powers are made optimum values for the respective areas.

Moreover, another object of the present invention is to provide an optical disc device that finds an optimum recording power by using a not-yet-used power calibration area in a case where an area to be written, which is an area in which data is to be written, is a not-yet-recorded area, and writes preliminary data to a power calibration area by using a recording laser power used for writing data to an area to be written and then finds an optimum recording power by using a power calibration area in which preliminary data has been written in a case where an area to be written is an already recorded area, thereby being able to record data by using a recording laser power to make an actually reproduced signal an optimum signal in both cases of the case where an area to be written is a not-yet-recorded area and the case where an area to be written is an already recorded area.

Then, in addition to the above-mentioned object, still another object of the present invention is to provide an optical disc device that writes data by using an optimum recording power corresponding to each data area in which data is to be written when an area to be written includes data areas in which data has been written by using recording laser powers that are different from each other, thereby being able to make a recording laser power an optimum value for each data area even when an area to be written includes data areas in which data has been written by using recording laser powers that are different from each other.

Then, in addition to the above-mentioned object, still another object of the present invention is to provide an optical disc device that records laser power information, which is information that makes a recording laser power when data is written in a data area correspond to the data area, in a specified area of an optical disc to eliminate the need for providing storing means for storing laser power information for each optical disc in a device, thereby being able to eliminate the need for additionally providing the functions of making the device more complex such as storing means for storing much laser power information and managing means for managing laser power information.

SUMMARY OF THE INVENTION

To solve the above-mentioned problems, an optical disc device in accordance with the present invention is applied to an optical disc device of the type which includes: recording power acquiring means for finding an optimum recording power when data is written in a data area by writing data for calibration in a power calibration area; and data writing means for writing data to an area to be written, which is a data area in which data is to be written, by using an optimum recording power found by the recording power acquiring means as a recording laser power, and in which a method for acquiring an optimum recording power, which is used by the recording power acquiring means when an area to be written is a not-yet-recorded area in which data is not yet written, is different from a method for acquiring an optimum recording power, which is used by the recording power acquiring means when an area to be written is an already recorded area in which data has been already written. Then, the optical disc device includes laser power recording means for recording laser power information, which makes a recording laser power when the data writing means writes data to a data area correspond to the data area, in a specified area of the optical disc. Then, when an area to be written is a not-yet-recorded area, the recording power acquiring means finds an optimum recording power by using a not-yet-used power calibration area, and when an area to be written is an already recorded area, the recording power acquiring means writes preliminary data to a power calibration area by using a recording laser power having been used for writing data to the area to be written and then finds an optimum recording power by using the power calibration area in which preliminary data has been written, and when an area to be written includes data areas in which data has been written by recording laser powers that are different from each other, before the data writing means starts writing data, the recording power acquiring means finds all optimum recording powers corresponding to the respective data areas that are different from each other in recording laser power and acquires recording laser powers corresponding to the data areas from the laser power information recorded in the specified area by the laser power recording means. Then, when an area to be written includes data areas in which data has been written by recording laser powers that are different from each other, the data writing means writes data to the respective data areas by using optimum recording powers corresponding to the respective data areas in which data is to be written as recording laser powers.

That is, finding an optimum recording power by using a power calibration area in which preliminary data has been written is equivalent to finding an optimum recording power by using an area to be written. For this reason, an optimum recording power found by using a power calibration area in which preliminary data has been written becomes an optimum recording laser power for writing data to an area to be written. Then, even when an area to be written includes data areas in which data has been written by recording laser powers that are different from each other, a recording laser power that the data writing means uses for writing data becomes an optimum recording laser power for each of the data areas. Then, even if a recording laser power when data has been written in an already recorded area is not stored in the device, the recording laser power is recorded as laser power information on the optical disc. Hence, when laser power information recorded on the optical disc is read, the recording laser power when data has been written in the already recorded area can be found. Then, because all optimum recording powers corresponding to the respective data areas that are different from each other in recording laser power are found before writing data is started, writing data can be performed continuously in terms of time without being interrupted so as to find optimum recording powers.

Moreover, an optical disc device in accordance with the present invention is applied to an optical disc device of the type which includes: recording power acquiring means for finding an optimum recording power when data is written in a data area by writing data for calibration in a power calibration area; and data writing means for writing data to an area to be written, which is a data area in which data is to be written, by using an optimum recording power found by the recording power acquiring means as a recording laser power, and in which a method for acquiring an optimum recording power, which is used by the recording power acquiring means when an area to be written is a not-yet-recorded area in which data is not yet written, is different from a method for acquiring an optimum recording power, which is used by the recording power acquiring means when an area to be written is an already recorded area in which data has been already recorded. Then, when an area to be written is a not-yet-recorded area, the recording power acquiring means finds an optimum recording power by using a not-yet-used power calibration area, and when an area to be written is an already recorded area, the recording power acquiring means writes preliminary data to a power calibration area by using a recording laser power having been used for writing data to the area to be written and then finds an optimum recording power by using the power calibration area in which preliminary data has been written.

That is, finding an optimum recording power by using a power calibration area in which preliminary data has been written is equivalent to finding an optimum recording power by using an area to be written. For this reason, an optimum recording power found by using the power calibration area in which preliminary data has been written becomes an optimum recording laser power for writing data to an area to be written.

In addition to the above-mentioned construction, when an area to be written includes data areas in which data has been written by recording powers that are different from each other, the recording power acquiring means finds optimum recording powers corresponding to the respective data areas that are different from each other in recording laser power, and the data writing means writes data to the respective data areas by using optimum recording powers corresponding to the respective data areas in which data is to be written as recording laser powers. That is, even when an area to be written includes data areas in which data has been written by using recording laser powers that are different from each other, recording laser powers that the data writing means uses for writing data become optimum recording laser powers for the respective data areas.

Then, in addition to the above-mentioned construction, the optical disc device includes laser power recording means for recording laser power information, which is information that makes a recording laser power when the data writing means writes data to a data area correspond to the data area, in a specified area of an optical disc, wherein the recording power acquiring means acquires a recording laser power corresponding to a data area from the laser power information recorded in the specified area by the laser power recording means. That is, even if a recording laser power when data is written in an area to be written is not stored in the device, the recording laser power is recorded as laser power information on the optical disc. Hence, when laser power information recorded on the optical disc is read, a recording laser power when data has been written in an already recorded area can be found.

According to the present invention, finding an optimum recording power by using a power calibration area in which preliminary data has been written is equivalent to finding an optimum recording power by using an area to be written. For this reason, an optimum recording power found by using the power calibration area in which preliminary data has been written becomes an optimum recording laser power for writing data to an area to be written. Then, even when an area to be written includes data areas in which data has been written by recording laser powers that are different from each other, recording laser powers that the data writing means uses for writing data become optimum recording laser power for the respective data areas. Then, even if recording laser power when data is written in an already recorded area is not stored in the device, the recording laser power is recorded as laser power information on the optical disc. Hence, when laser power information recorded on the optical disc is read, the recording laser power when data is written in the already recorded area can be found. Then, because all optimum recording powers corresponding to the respective data areas that are different from each other in recording laser power are found before starting writing data, writing data can be performed continuously in terms of time without being interrupted so as to find optimum recording powers. For this reason, in both cases of a case where an area to be written is a not-yet-recorded area and a case where an area to be written is an already recorded area, it is possible to record data by using recording laser power to make an actually reproduced signal a most suitable signal. In other words, it is possible to make a recording laser power when data is overwritten in an already recorded area an optimum value with the highest accuracy. Further, even when an area to be written includes areas in which data has been written by recording laser powers that are different from each other, it is possible to make recording laser powers optimum values for the respective areas and to eliminate the need for additionally providing the function of causing the device to be more complex such as storing means for storing much laser power information and managing means for managing laser power information. Still further, even when an area to be written includes areas in which data has been written by recording laser powers that are different from each other and when recording laser powers are made optimum values for the respective areas, it is possible to write data continuously in terms of time without interruption.

Then, according to the present invention, finding an optimum recording power by using a power calibration area in which preliminary data has been written is equivalent to finding an optimum recording power by using an area to be written. For this reason, an optimum recording power found by using the power calibration area in which preliminary data has been written becomes an optimum recording laser power for writing data to an area to be written. For this reason, in both cases of a case where an area to be is a not-yet-recorded area and a case where an area to be is an already recorded area, it is possible to record data by using a recording laser power to make an actually reproduced signal an optimum signal. In other words, it is possible to make a recording laser power when data is overwritten in an already recorded area an optimum value with the highest accuracy and to enhance the reliability of written data and to prevent the life of the optical disc from being unnecessarily shortened.

Further, even when an area to be written includes data areas in which data has been written by using recording laser powers that are different from each other, recording laser powers used for writing data become optimum recording laser power for the respective areas. For this reason, even when an area to be written includes data areas in which data has been written by using recording laser powers that are different from each other, it is possible to make recording laser powers optimum values of the respective areas.

Still further, even if a recording laser power when data is written in an area to be written is not stored in the device, the recording laser power is recorded as laser power information on the optical disc. Hence, when laser power information recorded on the optical disc is read, a recording laser power when data has been written in an already recorded area can be found. For this reason, it is possible to eliminate the need for additionally providing the function of causing the device to be more complex such as storing means for storing much laser power information and managing means for managing laser power information.

BRIEF DESCRIPTION OF THE DRAWINGS

FIGS. 4A to 4C are tables showing laser power information.

DETAILED DESCRIPTION OF THE INVENTION

Hereinafter, the embodiments of the present invention will be described with reference to the drawings.

Figure 1:
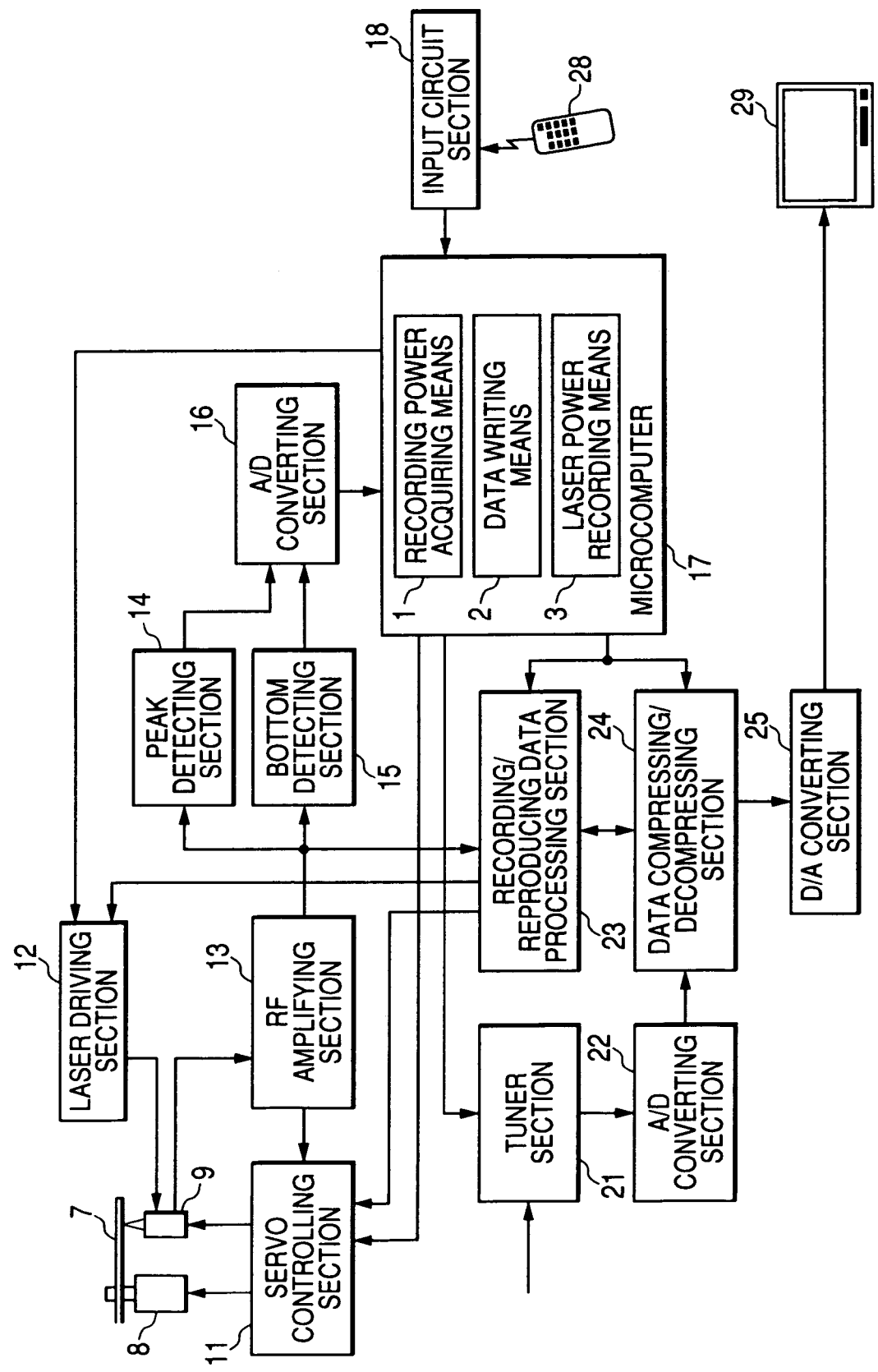
FIG. 1 is a block diagram showing the electric construction of a DVD recorder of one embodiment of an optical disc device in accordance with the present invention.

FIG. 1 is a block diagram showing the electric construction of a DVD recorder of one embodiment of an optical disc device in accordance with the present invention.

In the drawing, an optical disc 7 rotated and driven by a spindle motor 8 is an optical disc to which data can be rewritten and, specifically, is a DVD-RW or the like (hereinafter simply referred to as "DVD"). An optical pickup 9 outputs laser light according to a signal outputted from a laser driving section 12 to write data to the DVD 7. Then, the optical pickup 9 reads data written to the DVD 7.

The laser driving section 12 drives the optical pickup 9 according to data sent from a recording/reproducing data processing section 23. Then, the level of a driving signal for driving the optical pickup 9 is set at a value instructed by a microcomputer 17. That is, a recording laser power is set at power instructed by the microcomputer 17.

An RF amplifying section 13 produces a tracking error signal and a focus error signal on the basis of a signal outputted from the optical pickup 9 and outputs them to a servo control section 11. Then, the RF amplifier section 13 amplifies a signal outputted from the optical pickup 9 and outputs it to a peak detecting section 14, a bottom detecting section 15, and the recording/reproducing data processing section 23.

The peak detecting section 14 detects the peak level of a signal outputted from the RF amplifying section 13 and outputs it to an A/D converting section 16. The bottom detecting section 15 detects the bottom level of a signal outputted from the RF amplifying section 13 and outputs it to the A/D converting section 16. The A/D converting section 16 converts a peak level outputted from the peak detecting section 14 and a bottom level outputted from the bottom detecting section 15 to digital values and outputs them to the microcomputer 17.

The servo control section 11 servo-controls the tracking and focusing of the optical pickup 9 on the basis of a tracking error signal and a focus error signal outputted from the RF amplifying section 13. Then, the servo control section 11 servo-controls the rotational speed of the spindle motor 8 on the basis of a reproduced clock outputted from the recording/reproducing data processing section 23.

An input circuit section 18 is provided with a plurality of key switches such as power source key fitted in the front panel of a device body (not shown), a light receiving unit receiving an infrared signal sent from a remote controller 28, and the like, and has instruction inputted from a user and sends the instruction inputted from the user to the microcomputer 17.

A tuner section 21 receives a commercial broadcast of a channel instructed by the microcomputer 17. Then, the tuner section 21 outputs a received analog image signal (including analog voice signal) to the A/D converting section 22. The A/D converting section 22 converts the analog image signal outputted from the tuner section 21 to a digital image signal (including digital voice signal) and outputs it to a data compressing/decompressing section 24. A D/A converting section 25 converts the digital image signal (including digital voice signal) outputted from the data compressing/decompressing section 24 to an analog image signal (including analog voice signal) and outputs it to a television receiver 29 provided outside.

The recording/reproducing data processing section 23 is mainly constructed of a DSP and demodulates digital data from a signal outputted from the RF amplifying section 13. Then, the recording/reproducing section 23 subjects the demodulated digital data to specified processing (8-16 demodulation, error correction, or the like) to demodulate image voice information. Then, the recording/reproducing section 23 sends the demodulated image voice information to the data compressing/decompressing section 24. Then, the recording/reproducing data processing section 23 sends data, which is obtained by subjecting the image voice information sent from the data compressing/decompressing section 24 to specified processing (8-16 demodulation, or the like), to the laser driving section 12, thereby recording the image voice information on the DVD 7.

The data compressing/decompressing section 24 is provided with an encoder, a decoder, a stream controlling section, and the like (which are not shown) and compresses a digital image signal (including a digital voice signal) outputted from the A/D converting section 22 in an MPEG 2 mode (compresses a digital voice signal in an AC 3 mode or a Dolby mode). Then, after compressing the signal, the data compressing/decompressing section 24 outputs image voice information obtained by multiplexing to the recording/reproducing data processing section 23.

Then, the data compressing/decompressing section 24 separates the image voice information outputted from the recording/reproducing data processing section 23 into image information, voice information, sub-picture information. Then, the data compressing/decompressing section 24 decompresses the separated image information in the MPEG2 mode and then superimposes character information and the like instructed from the microcomputer 17 to the decompressed image information by using an on-screen display circuit and then outputs it to the D/A converting section 25 (decompresses the voice information in the AC3 mode or the Dolby mode and outputs the decompressed voice information to the D/A converting section 25).

The microcomputer 17 controls the main operation as a DVD recorder. That is, when an instruction of reproduction is inputted to the remote controller 28, the microcomputer 17 controls the servo control section 11, the recording/reproducing data processing section 23, and the data compressing/decompressing section 24 to reproduce data recorded on the DVD 7 and displays the data on the television receiver 29. Then, when an instruction of recording is inputted to the remote controller 28, the microcomputer 17 controls the servo control section 11, the recording/reproducing data processing section 23, the tuner section 21, and the data compressing/decompressing section 24 to record (write) a commercial broadcast received by the tuner section 21 on the DVD 7.

Then, when the microcomputer 17 records a commercial broadcast on the DVD 7, the microcomputer 17 finds a recording laser power required to write the data to DVD 7 before the action of writing data for recording to the DVD 7. Then, when the microcomputer 17 writes data to the DVD 7, the microcomputer 17 records laser power information, which makes a recording laser power when the data is written correspond to a data area in which the data is written, on the DVD 7. For this reason, the microcomputer 17 is provided with recording power acquiring means 1, data writing means 2, and laser power recording means 3.

The recording power acquiring means 1 writes data for calibration in a power calibration area (PCA) of the optical disc to find an optimum recording power (OPC: Optimum Power Calibration) when data is written in a data area. Then, an optimum recording power is found by different methods depending on a case where an area (area to be written) instructed as an area in which data is written is a not-yet-recorded area where data is not yet written and a case where the area to be written is an already recorded area where data has been already recorded.

That is, when an area to be written is a not-yet-recorded area where data is not yet written, the recording power acquiring means 1 finds an optimum recording power by using a not-yet-used power calibration area, whereas when an area to be written is an already recorded area, the recording power acquiring means 1 writes preliminary data in a power calibration area by using a recording laser power having been used for writing data to an area to be written and then finds an optimum recording power by using the power calibration area where preliminary data has been written (a method for acquiring recording laser power will be described later in detail).

Then, when an area to be written includes areas where data has been written by recording laser powers that are different from each other, the recording power acquiring means 1 finds an optimum recording power used for writing data for each of the areas which are different from each other in recording laser power. Then, at this time, before the data writing means 2 writes data, the recording power acquiring means 1 finds all optimum recording powers for all data areas that are different from each other in recording laser power. That is, when an area to be written includes N areas that are different from each other in recording laser power, the recording power acquiring means 1 finds all optimum recording powers for all of the N data areas before the data writing means 2 writes data.

In a case where an area to be written includes areas in which data has been written by the recording laser powers that are different from each other, data is written in the areas while changing a recording laser power in the process of writing data. Even in this case, to prevent the action of writing data from being interrupted by the action of finding an optimum recording power, the recording power acquiring means 1 performs the above-mentioned action.

The data writing means 2 writes data in an area to be written, which is a data area indicated as an area to be written, by using an optimum recording power found by the recording power acquiring means 1. Then, when the area to be written includes data areas in which data has been written by recording laser powers that are different from each other, the data writing means 2 writes data to each of the data areas by using an optimum recording power corresponding to each data area to be written.

When the data writing means 2 writes data in the data area, the laser power recording means 3 records laser power information, which is information that makes information showing a recording laser power having been used for writing data correspond to information showing a data area in which data has been written, in a specified area of the DVD 7.

Here, in the standards relating to the DVD 7, as for a recording laser power used for writing data, recording only a recording laser power used for finally writing data is defined as an option. However, in this embodiment, when data is written in an area to be written, laser power information, which is information that makes information showing an area to be written (starting address and ending address of an area in which data is written) correspond to information showing a recording laser power, is stored in the DVD 7.

Then, as for the laser power information, in this embodiment, the above-mentioned information is recorded in a not-yet-defined area in RMD (Recording Management Data) recorded in RMA (Recording Management Area), which is an area formed on the outer peripheral side next to PCA.

Figure 2:
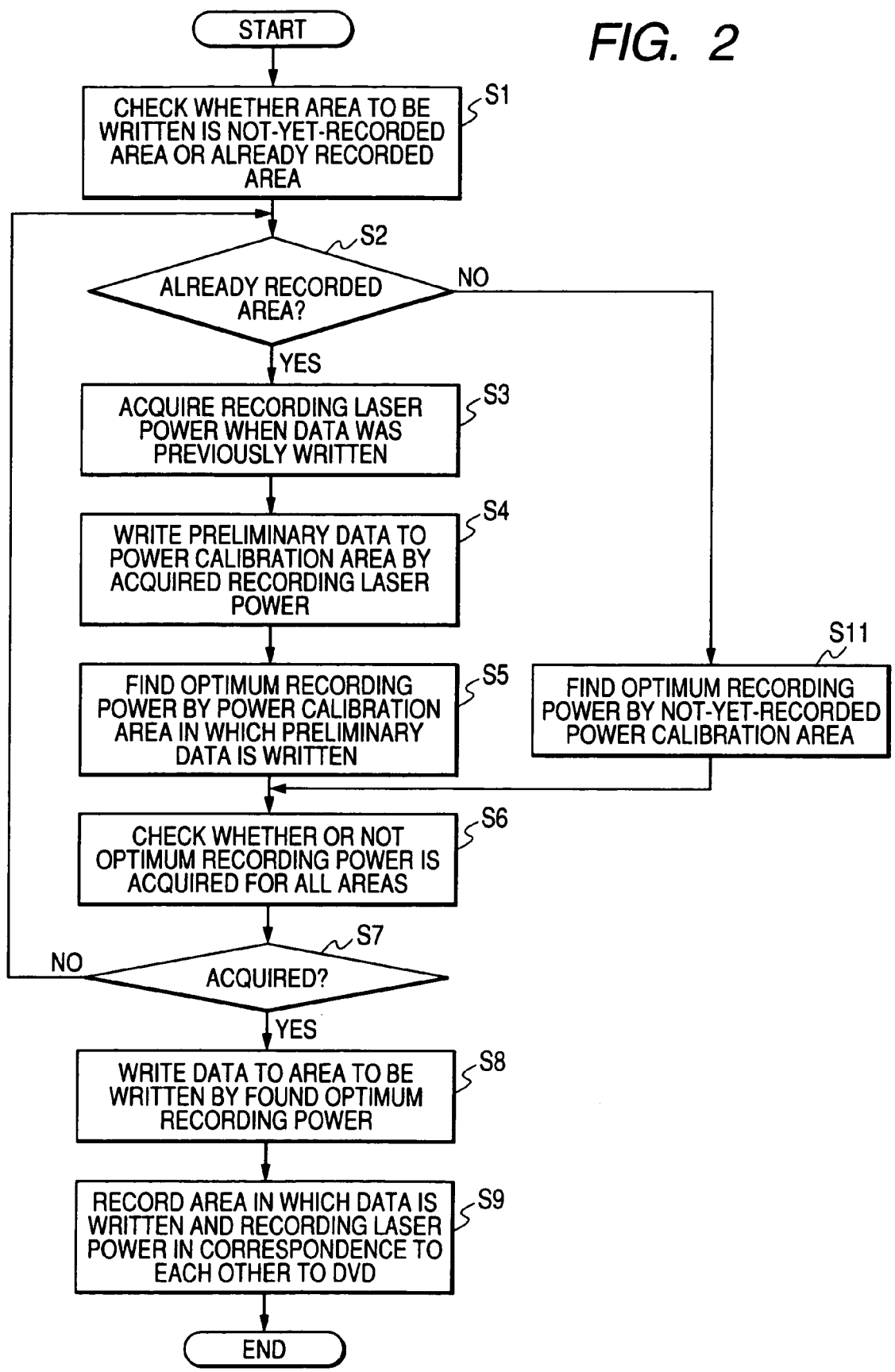
FIG. 2 is a flow chart showing the main operation of the embodiment at the time of finding an optimum recording power.

FIG. 2 is a flow chart showing the main operation of the embodiment at the time of recording data on the DVD 7. The operation of the embodiment will be described with reference to the drawing when necessary.

When the DVD 7 is placed on a tray (not shown) and is pulled into a reproducing position, the microcomputer 17 reads RMD recorded on the DVD 7 and stores it therein. Now, assuming that data has been recorded on the DVD 7, laser power information that makes a data area correspond to a recording laser power when data has been recorded in the data area is included in RMD (which will be described later in detail). Hence, when the DVD 7 is moved to a reproducing position and RMD is read, the laser power information is also read and is stored in the microcomputer 17.

In the above-mentioned state, when data is written to the DVD 7 so as to record a commercial broadcast received by the tuner section 21 or to record an image signal from the outside (not shown) on the DVD 7 (when an instruction to write data to the DVD 7 is provided), the recording power acquiring means 1 checks whether an area to be written of a data area in which data is to be written is a not-yet-recorded area or an already recorded area (step S1). When the area to be written is an already recorded area, the recording power acquiring means 1 acquires a recording laser power when data has been previously written in the area to be written from the laser power information stored in the microcomputer 17 (step S2, S3).

Next, the recording power acquiring means 1 writes preliminary data to a power calibration area of a not-yet-recorded area by using the acquired recording laser power. Then, because it is preferable that preliminary data that is written at this time is similar to data that has been already recorded in the area to be written, a part of data that has been already recorded in the area to be written or data similar to the above-mentioned data is used (step S4).

When the recording power acquiring means 1 finishes writing preliminary data, the recording power acquiring means 1 finds an optimum recording power by using a power calibration area in which the recording power acquiring means 1 has written preliminary data. That is, the recording power acquiring means 1 writes data for OPC to the power calibration area, in which the recording power acquiring means 1 has written preliminary data, while changing laser power stepwise. Then, the recording power acquiring means 1 reads the peak value (detected by the peak detecting section 14) of a reproducing signal outputted from the RF amplifying section 13 when written data is reproduced and the bottom value of the reproducing signal (detected by the bottom detecting section 15) via the A/D converting section 22 and performs a specified computation to find an optimum recording power (step S5).

When an optimum recording power is found, the data writing means 2 sets the laser driving section 12 so that a signal level to drive the optical pickup 9 becomes a signal level corresponding to the optimum recording power. Then, the data writing means 2 controls the data compressing/decompressing section 24 in such a way that image voice information obtained by compressing an image signal outputted from the A/D converting section 22 is outputted to the recording/reproducing data processing section 23. Then, the data writing means 2 controls the recording/reproducing data processing section 23 in such a way that the image voice processing information outputted from the data compressing/decompressing section 24 is subjected to specified processing and is outputted to the laser driving section 12. That is, the data writing means 2 writes a commercial broadcast received by the tuner section 21 to an area to be written of the DVD 7 by using an optimum recording power found by the recording power acquiring means 1 (step S6 to S8).

Then, when recording the commercial broadcast is finished, that is, writing data to the area to be written is finished by using the optimum recording power as a recording laser power, the laser power recording means 3 produces laser power information, which makes information showing an area to be written (starting address and ending address of an area to be written) correspond to a recording laser power when data has been written in the area to be written, and writes it to the DVD 7 (step S9).

Meanwhile, when an area to be written is a not-yet-recorded area, operation proceeds from step S2 to step S11 where the recording power acquiring means 1 finds an optimum recording power by using a not-yet-used area in a power calibration area as a power calibration area (performs OPC). Thereafter, operation proceeds to steps S6, S7, S8 where data is written in the area to be written by using the found optimum recording power. Then, when writing data in the area to be written is finished, the laser power recording means 3 produces laser power information, which makes information showing an area to be written correspond to recording laser power when data is written in the area to be written, and writes it to the DVD 7 (step S9).

Hereinafter, operation when an area to be written includes areas where data is written by recording laser powers that are different from each other will be described.

Figure 3A:
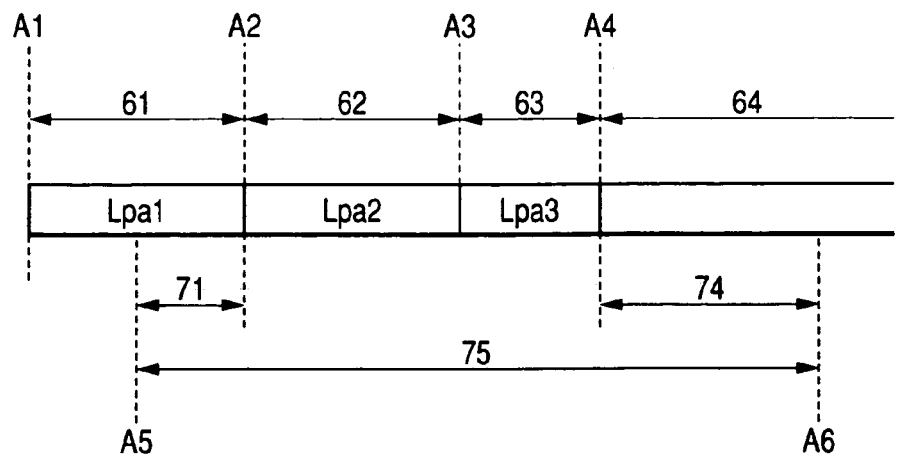
FIGS. 3A to 3C are diagrams showing areas to be written and changes in recording laser power.

That is, as shown in FIG. 3A, it is assumed that: data is written in an area 61, which has a starting address A1 and an ending address A2, of the data area of the DVD 7 by a recording laser power Lpa1; data is written in an area 62, which has a starting address A2 and an ending address A3, by a recording laser power Lpa2; data is written in an area 63, which has a starting address A3 and an ending address A4, by a recording laser power Lpa3 (areas after an area 64 are not-yet-recorded areas).

Here, to be more precise, ending addresses are values obtained by subtracting 1 from the above-described values, respectively. This is ditto for the following description (including drawings).

Then, it is assumed that the starting address and the ending address of an area instructed to be an area to be written (shown by 75) are A5 and A6. That is, it is assumed that an area to be written extends over four areas including the area 61 written by the recording laser power Lpa1, the area 62 written by the recording laser power Lpa2, the area 63 written by the recording laser power Lpa3, and the not-yet-recorded area 64. Hence, at this time, laser power information read from the DVD 7 and stored in the microcomputer 17 becomes the contents shown in FIG. 4A.

For this reason, at the time of recording data, the recording power acquiring means 1 acquires optimum recording powers by the following operation before writing data. That is, the recording power acquiring means 1 checks whether or not an area to be written 75 having a starting address A5 and an ending address A6 is a not-yet-recorded area. Then, the recording power acquiring means 1 determines that an area between the address A5 and the address A4 is an already recorded area and an area between the address A4 and the address A6 is a not-yet-recorded area. Then, the recording power acquiring means 1 determines that recording laser powers are different among an area 71 between the address A5 and the address A2, an area 62 between the address A2 and the address A3, and an area 63 between the address A3 and the address A4 (step S1) Thereafter, the recording power acquiring means 1 writes preliminary data by using the recording laser power Lpa1 and an optimum recording power Lpb1 for the area 71 is found by using an area in which preliminary data has been written (steps S2 to S5). Next, operation proceeds from steps S6, S7 to step S2 where an optimum recording power Lpa2 for the area 62 is found by using the same method. Then, an optimum recording power Lpa3 for the area 63 is found by repeating the same operation. Thereafter, an optimum recording power Lpb4 for the area 74 is found (an optimum recording power Lpb4 can be found by OPC using a not-yet-used power calibration area) (steps S2, S1). Next, operation proceeds to steps S6, S7, and S8 where writing data is started.

Figure 3B:
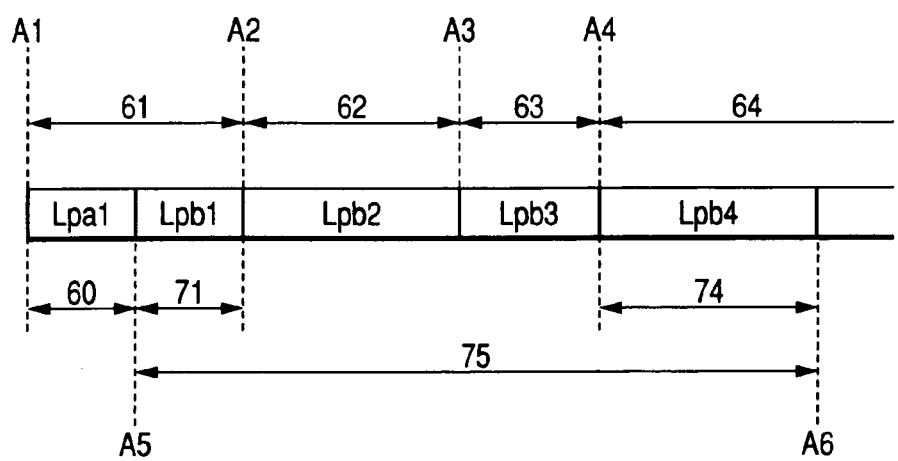
Figure 3C:
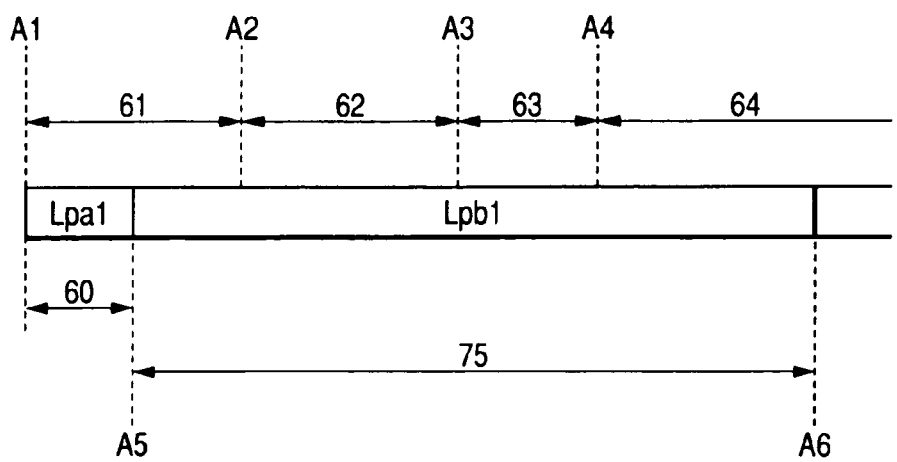

At the time of writing data, the data writing means 2, as shown in FIG. 3B, writes data to the area 71 by using the optimum recording power Lpb1 as a recording laser power. Then, the data writing means 2 writes data to the area 62 by using the optimum recording power Lpb2 as a recording laser power and writes data to the area 63 by using the optimum recording power Lpb3 as a recording laser power and writes data to the area 74 by using the optimum recording power Lpb4 as a recording laser power.

That is, in step S8, the operation of writing data is performed without being interrupted by an operation for finding an optimum recording power. For this reason, as far as the time required to find an optimum recording power for each of a plurality of area can be secured prior to starting to write data is performed, after starting writing data, recording data can be performed without being interrupted. For this reason, even when an area to be written includes areas that are different from each other in recording laser power and a method for writing data to each area by using an optimum recording power found for each area is used, it is possible to receive a commercial broadcast and to record it on the DVD 7 without causing a problem that recording data is interrupted in the process of recording data.

Then, when writing data in the area 75 to be written is finished, the laser power recording means 3 produces the laser power information shown in FIG. 4B and writes it to the DVD 7. That is, a recording laser power corresponding to an area 60 among the address A1 to the address A5 is Lpa1 which is the value of a recording laser power before starting writing data because the area 60 is not rewritten. Then, the laser power recording means 3 produces laser power information including Lpb1 for an area 71 and Lpb2 to Lpb4 for the areas 62 to 64 and records them on the DVD 7.

Then, in this embodiment, apart from a mode used for the above-mentioned writing method, there is prepared a quick mode used when timing for starting recording needs to be hastened. That is, when this mode is used, the recording power acquiring means 1 considers the recording laser power Lpa1 of the first area (corresponding to the area 61 in this case), which starts from the starting address of the area 75 to be written, to be used for the whole areas of the area 75 to be written. Then, the recording power acquiring means 1 writes preliminary data to the power calibration area by using the recording laser power Lpa1 and then finds the optimum recording power Lpb1.

When the recording power acquiring means 1 finds the optimum recording power Lpb1, the recording power acquiring means 1 provides the data writing means 2 an instruction to start writing data and makes the data writing means 2 write data to all area 75 by using the optimum recording power Lpb1 as recording laser power. Then, when the data writing means 2 finishes writing data, the data writing means 2 provides the laser power recording means 3 with an instruction to produce laser power information. For this reason, the laser power recording means 3 produces laser power information shown in FIG. 4C and records it on the DVD 7.

Then, the present invention is not limited to the above-mentioned embodiment but can be similarly applied to other devices using an optical disc as a recording medium (for example, a combination hard disc drive and DVD recorder having the function of using a hard disc drive as a recording medium).

Then, the present invention may be so constructed as to record laser power information in an area different from RMD.

Then, the optical disc 7 can be similarly applied also to other rewritable optical discs (DVD-RAM and the like).

What is claimed is:

1. An optical disc device comprising:
 a recording power acquiring unit that finds optimum recording power when data is written in a data area by writing data for calibration in a power calibration area;

a data writing unit that writes data in a data area to be written by using an optimum recording power found by the recording power acquiring unit as a recording laser power; and a laser power recording unit that records laser power information which makes a recording laser power when the data writing unit writes data in a data area correspond to the data area in a predetermined area of an optical disc, wherein a method for acquiring an optimum recording power used by the recording power acquiring unit when an area to be written is a not-yet-recorded area in which data is not written is different from a method for acquiring an optimum recording power used by the recording power acquiring unit when an area to be written is an already recorded area in which data was already written, when an area to be written is a not-yet-recorded area, the recording power acquiring unit finds an optimum recording power by using a not-yet-used power calibration area, when an area to be written is an already recorded area, the recording power acquiring unit writes preliminary data in a power calibration area by using a recording laser power used for writing data in the area to be written and finds an optimum recording power by using the power calibration area in which preliminary data was written, when an area to be written includes data areas in which data was written by recording laser powers that are different from each other, before the data writing unit starts writing data, the recording power acquiring unit finds all optimum recording powers corresponding to the respective data areas that are different from each other in recording laser power and acquires recording laser powers corresponding to the respective data areas from the laser power information recorded in the predetermined area by the laser power recording unit, and when an area to be written includes data areas in which data was written by recording laser powers that are different from each other, the data writing unit writes data in the respective data areas by using optimum recording powers corresponding to the respective data areas to be written as recording laser powers.

2. An optical disc device comprising:

a recording power acquiring unit that finds an optimum recording power when data is written in a data area by writing data for calibration in a power calibration area; and a data writing unit that writes data in a data area to be written by using an optimum recording power found by the recording power acquiring unit as a recording laser power, wherein a method for acquiring an optimum recording power used by the recording power acquiring unit when an area to be written is a not-yet-recorded area in which data is not yet written is different from a method for acquiring an optimum recording power used by the recording power acquiring unit when an area to be written is an already recorded area in which data was already written, when an area to be written is a not-yet-recorded area, the recording power acquiring unit finds an optimum recording power by using a not-yet-used power calibration area, and when an area to be written is an already recorded area, the recording power acquiring unit writes preliminary data in a power calibration area by using a recording laser power used for writing data in the area to be written and finds an optimum recording power by using the power calibration area in which preliminary data was written.

3. The optical disc device as claimed in claim 2, wherein when an area to be written includes data areas in which data was written by using recording powers that are different from each other, the recording power acquiring unit finds optimum recording powers corresponding to the respective data areas that are different from each other in recording laser power, and the data writing unit writes data in the respective data areas by using optimum recording powers corresponding to the respective data areas in which data is to be written as recording laser powers.

4. The optical disc device as claimed in claim 2, further comprising:

a laser power recording unit that records laser power information which makes a recording laser power when the data writing unit writes data in a data area correspond to the data area in a predetermined area of an optical disc, wherein the recording power acquiring unit acquires a recording laser power corresponding to a data area from the laser power information recorded in the predetermined area by the laser power recording unit.

* * * * *